United States Patent Office 3,469,676
Patented Sept. 30, 1969

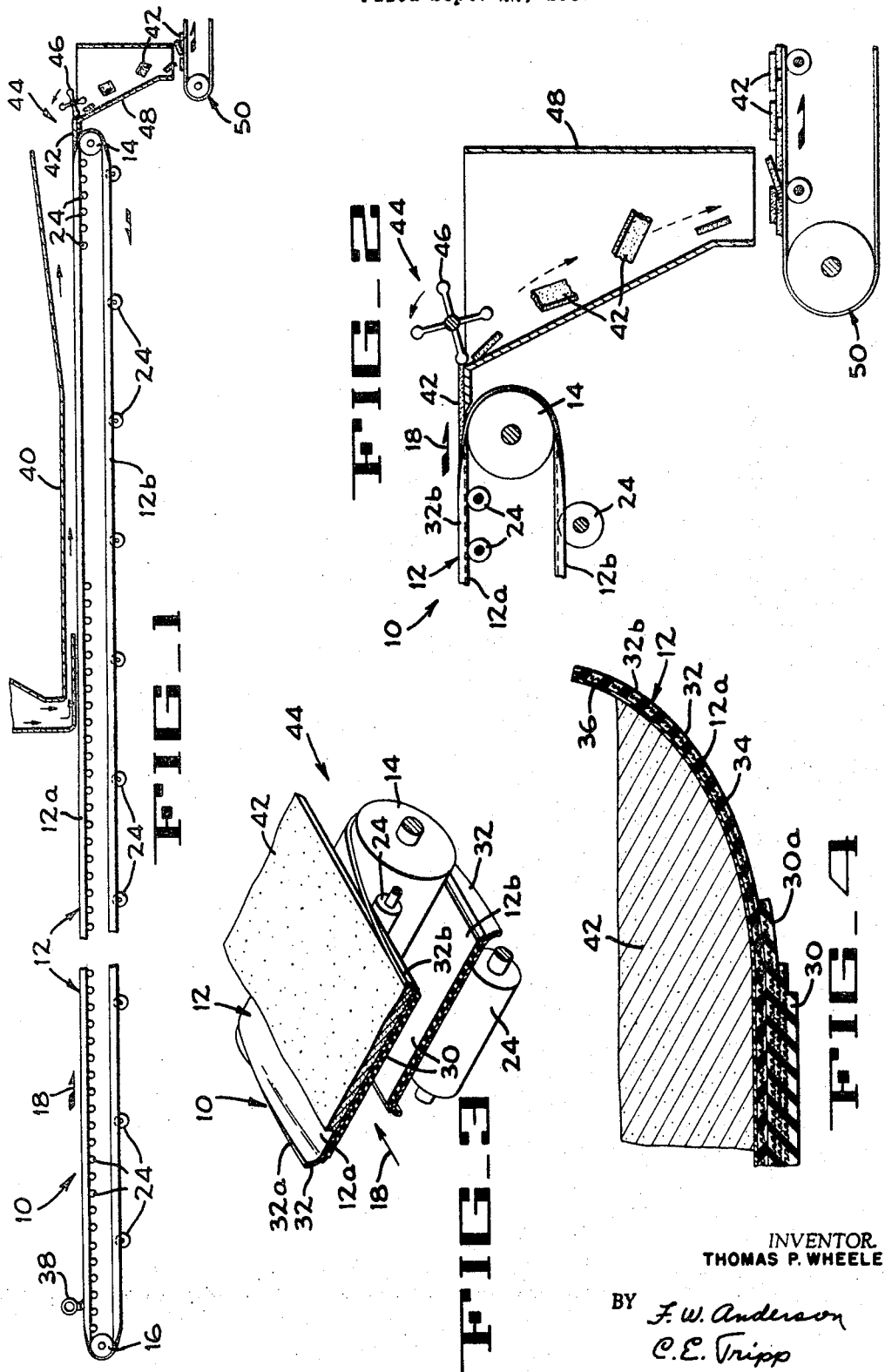

3,469,676
SELF-TROUGHING SELF-RELEASING CONVEYOR
Thomas Percy Wheeler, Los Gatos, Calif., assignor to FMC Corporation, San Jose, Calif., a corporation of Delaware
Filed Sept. 22, 1967, Ser. No. 669,916
Int. Cl. B65g *15/40*
U.S. Cl. 198—201                                   5 Claims

ABSTRACT OF THE DISCLOSURE

An endless belt-type conveyor having a substantially flat, conveying surface and inwardly curling, resiliently flexible side edges having a plastic surface, providing a self-troughing and self-releasing conveyor for use in continuously producing frozen liquid material in slab form.

BACKGROUND OF THE INVENTION

Field of the invention.—The present invention is a flattenable trough-type conveyor which is particularly well adapted for use in the production of frozen solids-bearing liquids such as fruit juices, egg, coffee extract, etc., in slab form on a continuous basis.

Description of the prior art.—In the production of freeze-dried solids-bearing liquids it is desirable for some purposes to prepare the frozen material, particularly coffee extract, in slab form preparatory to performing the drying portion of the process.

In general, known apparatus for continuously freezing solids-bearing liquids in slab form include a conveyor having an endless belt on which the material is frozen. Such belts are usually made of thin, flexible stainless steel or aluminum or other material to which the liquid material becomes stuck during the freezing process. There is, therefore, the problem of removing the slab of frozen extract from the belt without stopping the conveyor or damaging the belt and without breaking or partially thawing the slab of frozen material.

The use of a belt in continuously producing frozen slab material has been disclosed in United States patents to Maguire, No. 2,282,525, Turner, No. 2,643,526 and DeGeorge No. 3,253,420. Among these, only DeGeorge recognizes the problem of preventing the material from flowing off the belt during the formation of a frozen slab of material. Therefore, Maguire and Turner do not teach a solution this problem.

DeGeorge solves the problem of retaining the fluid extract on the belt prior to freezing by providing a water-ice wall or auxiliary belts that travel with the freezing belt and provides retaining walls therealong.

Maguire provides a bank of vibrators to shake a transverse area of the freezing belt near its discharge end in order to loosen the frozen slab of material therefrom.

Turner interposes a strip of paper, for instance, between the belt and the material to be frozen and after freezing, peels the paper from the frozen material.

DeGeorge teaches the forming of a layer of ice on the surfaces of the freezing belt and the retaining walls, to which the extract will not so readily stick during freezing. This ice layer is fractured at the end of the conveyor where the slab is projected from the freezing belt, enabling it to fall away from the slab of frozen extract, the belt and the retaining side walls.

United States patent to Bayston No. 2,803,950 discloses the use of a conveyor employing a split cylindrical tubular conveyor belt that is advanced through a hollow cylindrical freezing evaporator while water is sprayed onto the portion of the belt traveling through the evaporator to continuously form a hollow cylinder of ice on the belt. As the belt is unrolled or flattened out at the discharge end of the conveyor, the hollow cylinder of ice is fractured by the tension exerted thereon by the belt and the broken chips of ice are released therefrom. Bayston does not teach or suggest the continuous formation of a slab of frozen material nor is he faced with the problem of continuously releasing a slab of frozen material from an advancing freezing belt.

British patent to Ackers No. 749,208 describes a self-troughing conveyor belt construction having a generally channel shaped cross section. The conveyor belt is comprised of two belt sections. The lower section is a flat carrier belt comprised of multiple plys of bonded fabric and rubber. The upper belt section is also constructed of fabric and rubber plys but includes lune shaped fillet sections between the end portions of the plys which are molded to form a smooth sided upstanding channel section. The two belt sections are then bonded together forming the troughed conveyor belt.

A second British patent also to Ackers No. 897,863 also describes a similar conveyor belt construction and method of molding same. This conveyor belt is constructed somewhat similarly to the channel shaped upper belt section of the previously described application, in which the base or central section of the channel is of a flat configuration and the end portions thereof are molded in an upwardly curved and tapered configuration such as the trough shape is formed.

SUMMARY OF THE INVENTION

In the production of instant coffee by freeze drying, it is desirable to freeze the liquid extract into slabs as the first step in producing the dehydrated end product having the texture and color of freshly ground coffee. The principal obstacles to producing the frozen extract in slab form on a continuous basis are: (1) since the liquid coffee extract must be frozen relatively slowly so as to retain the natural rich brown color of the coffee, the liquid extract must be kept from flowing off the sides of the freezing belt for perhaps a third of the total freezing time, until it becomes sufficiently solidified not to flow, and (2) the frozen slab of extract, which adheres tenaciously to nearly all materials, must be continuously, rapidly and easily released, in slab form from the freezing belt without stopping the conveyor or damaging the conveyor belt and without breaking or thawing the slab of frozen extract.

An object of the present invention is to provide a self-troughing conveyor belt construction which can be produced by eliminating the requirement for molding processes heretofore employed. This object is achieved by bonding plies of material that are produced in sheet form and have different coefficients of expansion to form a self curling carrier band. The central portion of the self-curling band is bonded to a stiffer backing material to form the desired trough shaped cross section.

Another object of the invention is to provide a self troughing conveyor belt construction with a non-sticking carrying surface having a special application as a freezing conveyor belt.

Under the present invention, the upper ply serves dual functions. By proper selection of this material (e.g. Teflon), it serves not only as a non-stick coating for the carrying surface of the conveyor but has been found to produce self curling at freezing temperatures.

BRIEF DESCRIPTION OF THE DRAWINGS

FIGURE 1 is a schematic side view, partially in section, showing the freezing conveyor of the present invention.

FIGURE 2 is an enlarged fragmentary detail showing the discharge end portion of the freezing conveyor seen in FIGURE 1.

FIGURE 3 is a perspective detail of the discharge end of the freezing conveyor, as viewed from above and to the right thereof.

FIGURE 4 is an enlarged fragmentary transverse section of the belt of the present freezing conveyor, showing one lateral edge portion thereof.

DETAILED DESCRIPTION

The freezing conveyor 10, schematically illustrated in FIGURE 1, will be assumed, for purposes of this disclosure, to be installed in a cold room, not illustrated, in which refrigerated air of a temperature in the order of −40° F. is circulated. Although the freezing conveyor 10 can be used in the continuous production of frozen slab material from any of a wide range of liquids or solids-bearing liquids, it will be disclosed herein as being used in the continuous production of frozen coffee extract in slab form.

The freezing conveyor 10 has an endless belt 12 that is trained around terminal pulleys 14 and 16 for advancing the belt in the direction of the arrow 18 and for maintaining the conveying run 12a and the return run 12b under the desired tension. Idler pulleys 24 are provided to support the conveying and return runs 12a and 12b of the belt 12 in substantially horizontal planar position between the terminal pulleys 14 and 16.

With particular reference to FIGURE 4, the endless freezing belt 12 is a laminate consisting of a flat central portion or backing 30, extending throughout the lengths of the belt, to which a two-ply carrier band 32 is bonded. The backing 30 is composed of natural rubber, reinforced with three thicknesses of cotton duck and has a nominal thickness of one-eighth inch. The backing 30 remains flexible in the temperatures to which it is subjected during operation of the freezing conveyor 10 but is substantially prevented by the woven fabric reinforcement against stretching.

The carrier band 32 consists of an underply 34 of low temperature neoprene, reinforced with a single thickness of woven nylon fabric, and an outer ply 36 of food quality polytetrafluoroethylene, known as TFE, ten mills in thickness, that is coextensive with and is bonded to the underply 34. The woven fabric reinforcement of the underply allows the carrier band 32 great flexibility but substantially prevents it from stretching. The carrier band has a total thickness of 0.040 of an inch and is commercially obtainable under the name of Fairprene. The underply 34 of the carrier band 32 is bonded to the backing 30 so that the opposite side portions or edges 32a and 32b of the carrier band project equal distances beyond the backing 30 along opposite edges thereof.

A unique feature of the carrier band 32 is that, although the underply 34 and the outer ply 36 thereof are of sheet material they cooperate with each other in such a way that the carrier band 32 curls inward of its own volition, as shown in FIGURES 2 and 4, in the direction of the TFE outer ply 36, along both edges of the backing 30, providing a self-troughing conveyor. The reason for the carrier band curling inward in this way is not positively known. It is believed, however, that a differential in the coefficient of expansion and contraction of the neoprene underply 34 and the TFE outer ply 36 contributes to this condition. During use of the present freezing conveyor 10 in a −40° F. temperature, for instance, the edges 32a and 32b of the carrier band 32 curl inward more abruptly along the edges of the backing 30 than they do at normal room temperature of 70° F. to 72° F.

Although the carrier band 32 is resiliently flexible, the unsupported inwardly curled opposite edges 32a and 32b thereof offer sufficient resistance to straightening so as to retain a body of liquid, such as liquid coffee extract, from flowing off the sides of the belt 12 in the conveying run 12a. Thus, in order for a freezing belt 12, constructed in the manner set forth above, to retain a body of liquid of from one half to five-eights of an inch in thickness, the edges 32a and 32b of the carrier band 32 will project beyond the edges of the backing 30 a distance in the order of one and one-half inches.

It is to be noted that since the edges 32a and 32b of the belt 12 remain upwardly curled in liquid retaining position throughout the conveying run 12a they require no additional support. Consequently the belt 12 does not have to be guided to prevent lateral shifting of either run, as would be the case if the edges 32a and 32b had to be supported. As a matter of fact, there may be occasions when it might be of advantage to shift either one or both runs of the belt laterally of accurate alignment with the terminal pulleys 14 and 16.

It has been found helpful in constructing the present conveyor to restrain the edges 32a and 32b of the carrier band 32 from curling inward as abruptly as they would normally along the edges of the backing 30. This is accomplished by gradually reducing the thickness of the backing 30 along its edges, as shown at 30a in FIGURE 4, toward the carrier band 32. Thus, the backing 30 provides a slight resistance to the inward curling of the carrier band, to prevent such a sharp inward bend at this point that it might tend to impair the durability of the carrier band 32 along the edges of the backing 30.

Since it is substantially impossible for the carrier band 32 to stretch and because of its flexibly resilient nature, the curled edges 32a and 32b thereof are drawn flat against the cylindrical surfaces of the terminal pulleys 14 and 16 (see FIG. 3) as they are traversed by the belt 12 during operation of the conveyor, to provide a self-releasing conveyor. It is not necessary that the belt 12 be bent downward about a cylindrical pulley at the discharge end of the conveyor in order to flatten the curled edges 32a and 32b or that the edges overlie or engage any surface as they are flattened or when in their flattened position. It is necessary, however, that the belt be bent downward sufficiently to cause the edges 32a and 32b to flatten in the manner described.

In operation of the freezing conveyor 10 in the continuous production of frozen coffee extract in slab form, the extract is delivered onto the belt 12 through a pipe 38 (FIG. 1) at a temperature in the order of plus 40° F. The rate of delivery of the extract to the belt 12 of the conveyor 10 is coordinated with the rate of advance of the belt 12 so that the liquid extract will flow onto the TFE outer ply 36, between the upwardly curled edges 32a and 32b of the carrier band, to the desired thickness. The extract remains in a liquid condition on the self-troughing conveyor, being confined thereto by the upwardly curved edges 32a and 32b of the carrier band 32 during advance throughout approximately the first third of the length of the conveyor 10, before it is sufficiently solidified by the freezing atmosphere of the cold room to remain unaided on the belt.

During travel of the belt 12 throughout approximately the last third of the conveyor 10, the belt 12 carries the frozen slab beneath ducting 40 (FIG. 1) through the air in the cold room is forced with increased rapidity. This further freezes the slab of extract to the point where it becomes brittle and will fracture if struck a sharp blow with a hard object.

The conveyor 10 can be of any appropriate width and length, however, it has been found that when freezing coffee extract under the curcumstances set forth above, the entire operation from the time the extract flows onto the belt until the fully frozen slab 42 reaches the discharge end 44 of the conveyor, requires approximately an hour to an hour and twenty minutes.

When the fully frozen slab 42 reaches the discharge end 44 of the freezing conveyor 10, the edges 32a and 32b of the carrier band 32 are caused to flatten out as the belt 12 traverses the pulley 14 and are withdrawn from the slab to release it from the conveyor as the slab is projected from the conveyor.

Since the coffee extract does not stick to the TFE of which the outer ply 36 of the carrier band 32 is composed, the fully released slab 42 is projected continuously from the discharge end of the freezing conveyor 10 during operation thereof. Not only is this true of frozen coffee extract, but of most, if not all, other liquids of solids-bearing liquids which might be continuously frozen into slab form by use of the present self-troughing and self-releasing conveyor.

At the discharge end 44 of the freezing conveyor 10 (FIGS. 1 and 2), the frozen slab may be handled in any desired manner, such as by breaking the brittle slab by use of a rotating hammer device 46. The broken slab material may then be routed through a chute 48 to a take away conveyor 50 for transportation to a grinder before being subjected to the dehydration phase of the freeze drying process.

Although the best mode contemplated for carrying out the present invention has been shown and described herein, it will be apparent that modification and variation may be made therein without departing from what is regarded to be the subject matter of the invention, as set forth in the appended claims.

Having completed a detailed description of the invention so that those skilled in the art could practice the same, I claim:

1. A self troughing conveyor belt comprising a flat flexible backing belt, and a flexible carrier band bonded throughout its length on top of said backing belt, said carrier band including an underply of woven reinforcing fabric embedded in a rubber and an outer ply bonded to the top of said under ply, the contraction characteristics of the materials of said under ply and said outer ply being such that both plies curl inwardly toward the top of said band when the belt is subjected to temperatures substantially below a room temperature of approximately 70 degrees Farenheit, said flexible backing belt being sufficiently less flexible than said carrier band to maintain the carrier band flat where said band and said belt are bonded together and to permit upward curling of said belt along the side edges of said band thereby forming a trough-like cross section.

2. The conveyor belt of claim 1 wherein said carrier band is wider than said backing.

3. The conveyor belt of claim 1 wherein the outer ply of said carrier band is comprised of polytetrafluoroethylene.

4. The apparatus of claim 1 wherein said carrier band includes an under ply of nylon fabric reinforced neoprene and an outer ply of polytetrafluoroethylene.

5. The apparatus of claim 4 wherein said flexible backing belt is comprised of natural rubber reinforced with fabric.

References Cited

UNITED STATES PATENTS

| 2,693,403 | 11/1954 | Brumbaugh | 198—193 X |
| 2,803,950 | 8/1957 | Bayston | 62—345 |

FOREIGN PATENTS

| 897,863 | 5/1962 | Great Britain. |
| 953,208 | 3/1964 | Great Britain. |

EDWARD A. SROKA, Primary Examiner